US009880708B2

(12) United States Patent
Lambourne et al.

(10) Patent No.: US 9,880,708 B2
(45) Date of Patent: *Jan. 30, 2018

(54) USER INTERFACE

(71) Applicant: Sonos, Inc., Santa Barbara, CA (US)

(72) Inventors: Robert A. Lambourne, Santa Barbara, CA (US); Andrew J. Schulert, Cambridge, MA (US); Steve Holmgren, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 267 days.

This patent is subject to a terminal disclaimer.

(21) Appl. No.: 14/729,643

(22) Filed: Jun. 3, 2015

(65) Prior Publication Data
US 2015/0261397 A1 Sep. 17, 2015

Related U.S. Application Data

(63) Continuation of application No. 11/419,136, filed on May 18, 2006, now Pat. No. 9,075,509.

(51) Int. Cl.
*G06F 3/048* (2013.01)
*G06F 3/0482* (2013.01)
(Continued)

(52) U.S. Cl.
CPC .......... *G06F 3/0482* (2013.01); *G06F 3/0481* (2013.01); *G06F 3/0484* (2013.01);
(Continued)

(58) Field of Classification Search
CPC .............. G06F 3/0482; G06F 19/3468; G06F 17/30873; G06F 17/3002; G06F 17/30053; G06F 3/0481; G06F 3/0485
See application file for complete search history.

(56) References Cited

U.S. PATENT DOCUMENTS 5,440,644 A    8/1995 Farinelli et al.
5,745,716 A *  4/1998 Tchao ................... G06F 3/0483
                                                    715/777
(Continued)

FOREIGN PATENT DOCUMENTS

EP     1389853 A1     2/2004
WO     200153994      7/2001
WO     2003093950 A2  11/2003

OTHER PUBLICATIONS

Final Office Action dated on Dec. 11, 2014, issued in connection with U.S. Appl. No. 11/419136, filed May 18, 2006, 18 pages.

(Continued)

*Primary Examiner* — Linh K Pham
(74) *Attorney, Agent, or Firm* — McDonnell Boehnen Hulbert & Berghoff LLP

(57) ABSTRACT

An example implementation involves a control device displaying on a graphical user interface, an indicator positioned with respect to a particular multimedia item in a displayed list of a plurality of multimedia items. After displaying the indicator on the graphical user interface for a first predefined time, the control device displays on the graphical user interface, an information panel obstructing a portion of the displayed list, the information panel providing information associated with the particular multimedia item that is not shown in the displayed list. After displaying the information panel for a second predefined time, the control device terminates display of the information panel.

20 Claims, 10 Drawing Sheets

(51) Int. Cl.
  *G06F 3/0484* (2013.01)
  *G11B 27/34* (2006.01)
  *G06F 3/0481* (2013.01)
  *G06F 3/0485* (2013.01)
  *G06K 9/20* (2006.01)

(52) U.S. Cl.
  CPC ......... *G06F 3/0485* (2013.01); *G06K 9/2054* (2013.01); *G11B 27/34* (2013.01)

(56) References Cited

U.S. PATENT DOCUMENTS

| | | | |
|---|---|---|---|
| 5,761,320 A | 6/1998 | Farinelli et al. | |
| 5,923,902 A | 7/1999 | Inagaki | |
| 6,025,838 A | 2/2000 | Bardon et al. | |
| 6,032,202 A | 2/2000 | Lea et al. | |
| 6,256,554 B1 | 7/2001 | Dilorenzo | |
| 6,288,718 B1 * | 9/2001 | Laursen | G06F 3/0237 707/999.001 |
| 6,404,811 B1 | 6/2002 | Cvetko et al. | |
| 6,469,633 B1 | 10/2002 | Wachter | |
| 6,522,886 B1 | 2/2003 | Youngs et al. | |
| 6,611,537 B1 | 8/2003 | Edens et al. | |
| 6,631,410 B1 | 10/2003 | Kowalski et al. | |
| 6,690,391 B1 * | 2/2004 | Proehl | G06F 3/0362 715/720 |
| 6,757,517 B2 | 6/2004 | Chang | |
| 6,778,869 B2 | 8/2004 | Champion | |
| 6,788,319 B2 * | 9/2004 | Matsumoto | G06F 3/0482 348/E5.105 |
| 7,130,608 B2 | 10/2006 | Hollstrom | |
| 7,130,616 B2 | 10/2006 | Janik | |
| 7,143,939 B2 | 12/2006 | Henzerling | |
| 7,236,773 B2 | 6/2007 | Thomas | |
| 7,295,548 B2 | 11/2007 | Blank et al. | |
| 7,312,785 B2 * | 12/2007 | Tsuk | G06F 1/1626 345/156 |
| 7,345,671 B2 * | 3/2008 | Robbin | G06F 1/1626 178/18.01 |
| 7,483,538 B2 | 1/2009 | McCarty et al. | |
| 7,545,440 B2 | 6/2009 | Kim et al. | |
| 7,560,637 B1 | 7/2009 | Robbin et al. | |
| 7,571,014 B1 | 8/2009 | Lambourne et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,788,582 B2 | 8/2010 | Robbin et al. | |
| 7,853,341 B2 | 12/2010 | McCarty et al. | |
| 7,956,272 B2 | 6/2011 | Wysocki et al. | |
| 7,987,294 B2 | 7/2011 | Bryce et al. | |
| 8,014,423 B2 | 9/2011 | Thaler et al. | |
| 8,017,852 B2 | 9/2011 | Yamashita et al. | |
| 8,045,952 B2 | 10/2011 | Qureshey et al. | |
| 8,065,631 B1 * | 11/2011 | Donoghue | G06F 3/0481 715/713 |
| 8,103,009 B2 | 1/2012 | McCarty et al. | |
| 8,234,395 B2 | 7/2012 | Millington et al. | |
| 8,276,076 B2 | 9/2012 | Torrens et al. | |
| 8,483,853 B1 | 7/2013 | Lambourne | |
| 8,634,944 B2 | 1/2014 | Bull et al. | |
| 8,683,378 B2 | 3/2014 | Bull et al. | |
| 8,766,079 B2 | 7/2014 | Utsuki et al. | |
| 8,954,855 B2 | 2/2015 | Shirai et al. | |
| 8,977,963 B1 | 3/2015 | Joyce et al. | |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0089529 A1 * | 7/2002 | Robbin | G11B 27/105 715/716 |
| 2002/0124097 A1 | 9/2002 | Isely et al. | |
| 2003/0157951 A1 | 8/2003 | Hasty | |
| 2004/0024478 A1 | 2/2004 | Hans et al. | |
| 2004/0175159 A1 * | 9/2004 | Oetzel | G11B 27/031 386/243 |
| 2005/0138656 A1 * | 6/2005 | Moore | H04N 7/165 725/45 |
| 2006/0008256 A1 * | 1/2006 | Khedouri | G06F 17/30038 386/234 |
| 2006/0020904 A1 * | 1/2006 | Aaltonen | G06F 3/048 715/850 |
| 2006/0026521 A1 * | 2/2006 | Hotelling | G06F 3/0418 715/702 |
| 2006/0045462 A1 | 3/2006 | Poslinski | |
| 2006/0107822 A1 * | 5/2006 | Bowen | A63B 71/0686 84/612 |
| 2006/0136383 A1 | 6/2006 | Golla | |
| 2006/0156236 A1 * | 7/2006 | Heller | G11B 27/105 715/716 |
| 2006/0156239 A1 | 7/2006 | Jobs et al. | |
| 2006/0184901 A1 * | 8/2006 | Dietz | G06F 3/04855 715/855 |
| 2006/0195480 A1 * | 8/2006 | Spiegelman | G06F 17/30766 |
| 2006/0225097 A1 * | 10/2006 | Lawrence-Apfelbaum | H04N 7/17318 725/61 |
| 2007/0124680 A1 * | 5/2007 | Robbin | G10H 1/0008 715/727 |
| 2007/0136750 A1 | 6/2007 | Abanami et al. | |
| 2007/0142944 A1 | 6/2007 | Goldberg et al. | |
| 2007/0150830 A1 * | 6/2007 | Ording | G06F 3/0481 715/784 |
| 2009/0177654 A1 * | 7/2009 | Beaupre | G06F 17/30766 |
| 2010/0235408 A1 * | 9/2010 | Nichols | G06F 17/30038 707/805 |
| 2011/0022985 A1 * | 1/2011 | Ording | G06F 3/0481 715/830 |
| 2011/0040658 A1 * | 2/2011 | Gautier | G06F 9/4443 705/27.2 |
| 2011/0143653 A1 | 6/2011 | Lane et al. | |
| 2013/0047087 A1 | 2/2013 | Yamahara et al. | |
| 2013/0198268 A1 | 8/2013 | Hyman | |
| 2013/0198632 A1 | 8/2013 | Hyman | |
| 2015/0149901 A1 | 5/2015 | Otto et al. | |

OTHER PUBLICATIONS

"AudioTron Quick Start Guide, Version 1.0", Voyetra Turtle Beach, Inc., Mar. 2001, 24 pages.
"AudioTron Reference Manual, Version 3.0", Voyetra Turtle Beach, Inc., May 2002, 70 pages
"AudioTron Setup Guide, Version 3.0", Voyetra Turtle Beach, Inc., May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo" Analog Stereo Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
UPnP; "Universal Plug and Play Device Architecture," Jun. 8, 2000; version 1.0; Microsoft Corporation; pp. 1-54.
"Denon 2003-2004 Product Catalog," Denon, 2003-2004, 44 pages.
United States Patent and Trademark Office, U.S. Appl. No. 60/490,768, filed Jul. 28, 2003, entitled "Method for synchronizing audio playback between multiple networked devices," 13 pages.

(56) References Cited

OTHER PUBLICATIONS

United States Patent and Trademark Office, U.S. Appl. No. 60/825,407, filed Sep. 12, 2003, entitled "Controlling and manipulating groupings in a multi-zone music or media system," 82 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
"Corrected Notice of Allowance dated Apr. 21, 2015, issued in connection with U.S. Appl. No. 11/419,136, filed May 18, 2006", 11 pages.
"Final Office Action dated Dec. 11, 2014 for U.S. Appl. No. 11/419,136. filed May 18, 2006".
"Final Office Action dated Oct. 15, 2008 for U.S. Appl. No. 11/419,136. filed May 18, 2006".
"Final Office Action dated Feb. 16, 2011 for U.S. Appl. No. 11/419,136, filed May 18, 2006".
"Final Office Action dated Dec. 19, 2013 for U.S. Appl. No. 11/419,136, filed May 18, 2006".
Herrera; Perfecto et al., "SIMAC: Semantic Interaction with Music Audio Contents", 2005, 399-406.
Microsoft; Corporation., "Using Microsoft Outlook 2003", Cambridge College, 2003.
"Non-Final Office Action dated Jul. 3, 2013 for U.S. Appl. No. 11/419,136, filed May 18, 2006".
"Non-Final Office Action dated Jul. 8, 2010 for U.S. Appl. No. 11/419,136, filed May 18, 2006".
"Non-Final Office Action dated Apr. 15, 2008 for U.S. Appl. No. 11/419,136, filed May 18, 2006".
"Non-Final Office Action dated May 21, 2014 for U.S. Appl. No. 11/419,136, filed May 18, 2006".
"Notice of Allowance dated Mar. 5, 2015, issued in connection with U.S. Appl. No. 11/419,136, filed May 18, 2006, 21 pages".

* cited by examiner

USER INTERFACE

CROSS-REFERENCE TO RELATED APPLICATIONS

This application is a continuation of U.S. patent application Ser. No. 11/419,136, filed on May 18, 2006, entitled "User Interface to provide additional information on a selected item in a list," which is incorporated herein by reference in its entirety.

FIELD OF THE DISCLOSURE

The invention is generally related to the area of man machine interface. In particular, the invention is related to method and apparatus for providing additional or hidden information on a selected item in a list of items.

BACKGROUND

The most popular use of a scroll wheel may be probably found on an Apple's iPod. A scroll wheel of an iPod allows a user to scroll where he/she desires. Thus a user can choose songs to play on from lists of artists, albums, composers, genres, or tracks.

The underlying mechanism of a scroll wheel is a software module being executed to convert a physical motion of the user moving his/her finger over the scroll wheel to a highlight bar on a list of music items. The software module is configured based on the concept of 'acceleration'. In simple terms, this means that the faster the user turns the scroll wheel, the faster the list on the screen will scroll. This is very effective in allowing users to traverse long lists.

There are, however, at least two problems observed. First, it still takes a long time to get through a large list of music items. For example, if a desired item is an item No. 1500 in a list of 2000 songs, a user has to go through the first 1499 items before reaching the item No. 1500. Second, when a list is scrolled fast, it is very hard for the user to stop at the desired position without overshooting. For example. If the list is showing an artist named "Abba", and the user wants to scroll to an artist named "Sting", he/she must turn the scroll wheel fast in order to get from Abba to S's quickly. But because the list is long and so being scrolled fast, it is very easy to overshoot the list and get to the T's or U's by moving his/her finger on the scroll wheel too fast.

Once reaching a neighborhood of a desired item in a list, a user typically scrolls slowly through neighboring items before reaching the desired item. Depending on what is being searched, it is always preferable for the user to see what is being scrolled by in a substantially similar category. Sometimes, the desired item may not be in the list while there are others that are substantially similar to the desired item and may interest the user. FIG. 1A shows an example 150 of a music library called "albums" 152 including a list of albums. The contents 154 in the library 150 are shown as a list of items, each of the items is an album that may further include a list of tracks. As the user scrolls through the library 150, there is limited information about each of the albums except for a name thereof. It would be helpful if additional information is displayed without actually going into a specific album.

Thus, there is a need for solutions that can provide additional or hidden information on an item being selected, wherein a selection of an item means a stay of scrolling on the item for a predefined time.

SUMMARY

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to scrolling a list including many items that may be sorted or unsorted. According to one aspect of the present invention, a graphic user interface is provided to display the items in the list so that a user may scroll the list. After an item is highlighted for a predefined time, an information panel is automatically displayed to show hidden information associated with the item. According to another aspect of the present invention, the information panel is superimposed in an area of the graphic user interface, without obstructing the highlighted item.

According to still another aspect of the present invention, an indexing display is provided to facilitate a search of a desired item in the list. The indexing display provides a mechanism that can avoid going through a long list and wandering back and forth around the desired item. The indexing display includes a list of indexes, each corresponding to a group of items sharing one or more common characteristics (e.g., a character or a kind) The indexing display is allowed first to be scrolled for the desired index. Once the desired index is confirmed, searching for the desired item in the list starts at an item indexed by the desired index that also indexes the desired item.

The present invention may be implemented in many forms including software, hardware or a combination of both as a method and apparatus. According to one embodiment, the present invention is a method for scrolling a list of items, the method comprises providing a graphic user interface displaying the items in the list; and showing an information panel after an item in the list is highlighted for a predefined time, the information panel showing hidden information associated with the item, wherein the information panel is superimposed in an area of the graphic user interface. Depending on application, the method may be implemented as a software module loaded in a computer readable medium in a device (e.g., a portable device with a display screen). When executed, the software module causes the display to perform functions contemplated in the present invention.

According to another embodiment, the present invention is an apparatus for displaying a list of items, the apparatus comprises: a display screen, a screen driver configured to display the list on the display screen, a memory for storing code, a processor executing the code to perform operations of: providing a graphic user interface displaying the items in the list, and showing an information panel after an item in the list is highlighted for a predefined time, the information panel showing hidden information associated with the item, wherein the information panel is superimposed in the graphic user interface.

One of the objects, features, and advantages of the present invention is to provide solutions of effectively scrolling through a list of items.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION

The detailed description of the present invention is presented largely in terms of procedures, steps, logic blocks, processing, or other symbolic representations that directly or indirectly resemble the operations of devices or systems that can be used on networks. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Figure 1A:
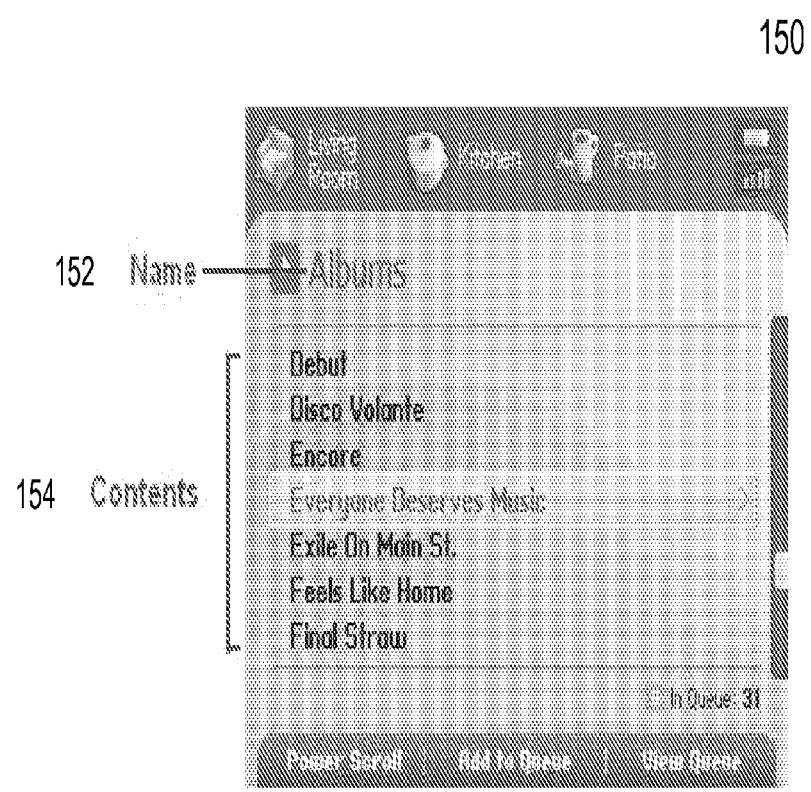
FIG. 1A shows an example of a music library called "albums" including a list of albums.
Figure 1B:
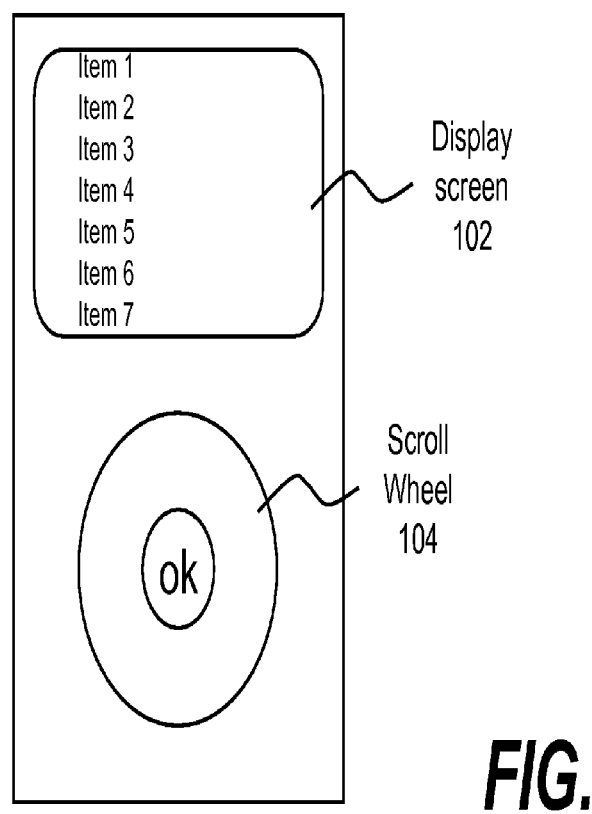
FIG. 1B shows an exemplary configuration in which the present invention may be practiced.

Referring now to the drawings, in which like numerals refer to like parts throughout the several views. FIG. 1B shows a front view of an Apple iPod 100 that includes a display screen 102 and a scroll wheel 104. A user may put a finger on the scroll wheel 104 to navigate a list being displayed in the screen 102 by moving the finger clockwise or counterclockwise. An acceleration of the finger movement would control a navigating speed of the list. Because the display screen 102 is relatively small, a search of an item down in the list would often overpass the item, resulting in repeated wandering back and forth around the item.

Figure 2A:
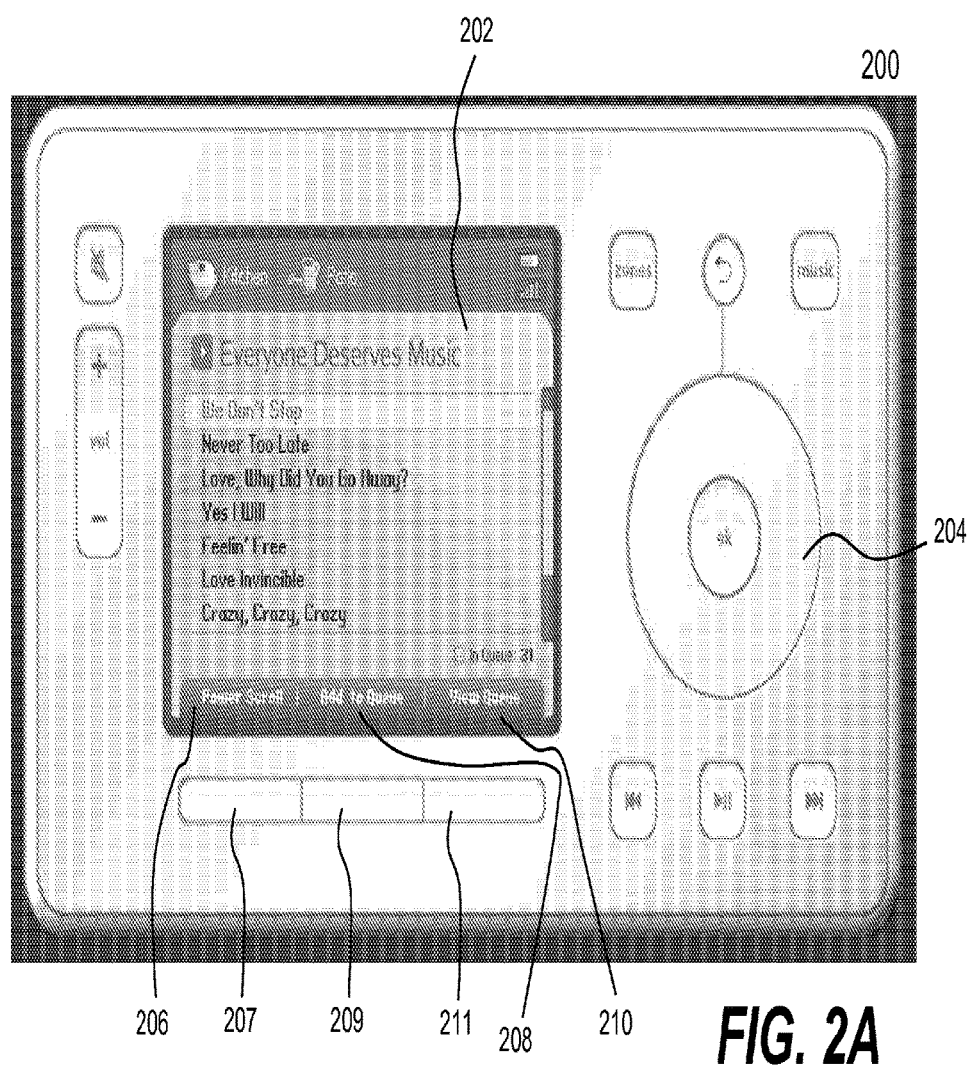
FIG. 2A shows an exemplary device in which the present invention is implemented according to one embodiment of the present invention.

FIG. 2A shows an exemplary device 200 in which the present invention is implemented according to one embodiment of the present invention. The device 200 includes a display screen 202 and a scroll wheel 204. Different from the device shown in FIG. 1, the display screen 202 includes a number of soft keys 206, 208, and 210 that can be respectively activated by buttons 207, 209, and 211. One of the soft keys 206 is labeled as "power scroll" that can be activated to start what is referred to herein as power scrolling. The soft key 206 may be activated by other means (e.g., touch screen). One of the features of the power scrolling is the underlying mechanism that provides a narrowed searching range from which a desired item may be readily located in a large list of items that may be provided locally or remotely.

Figure 2B:
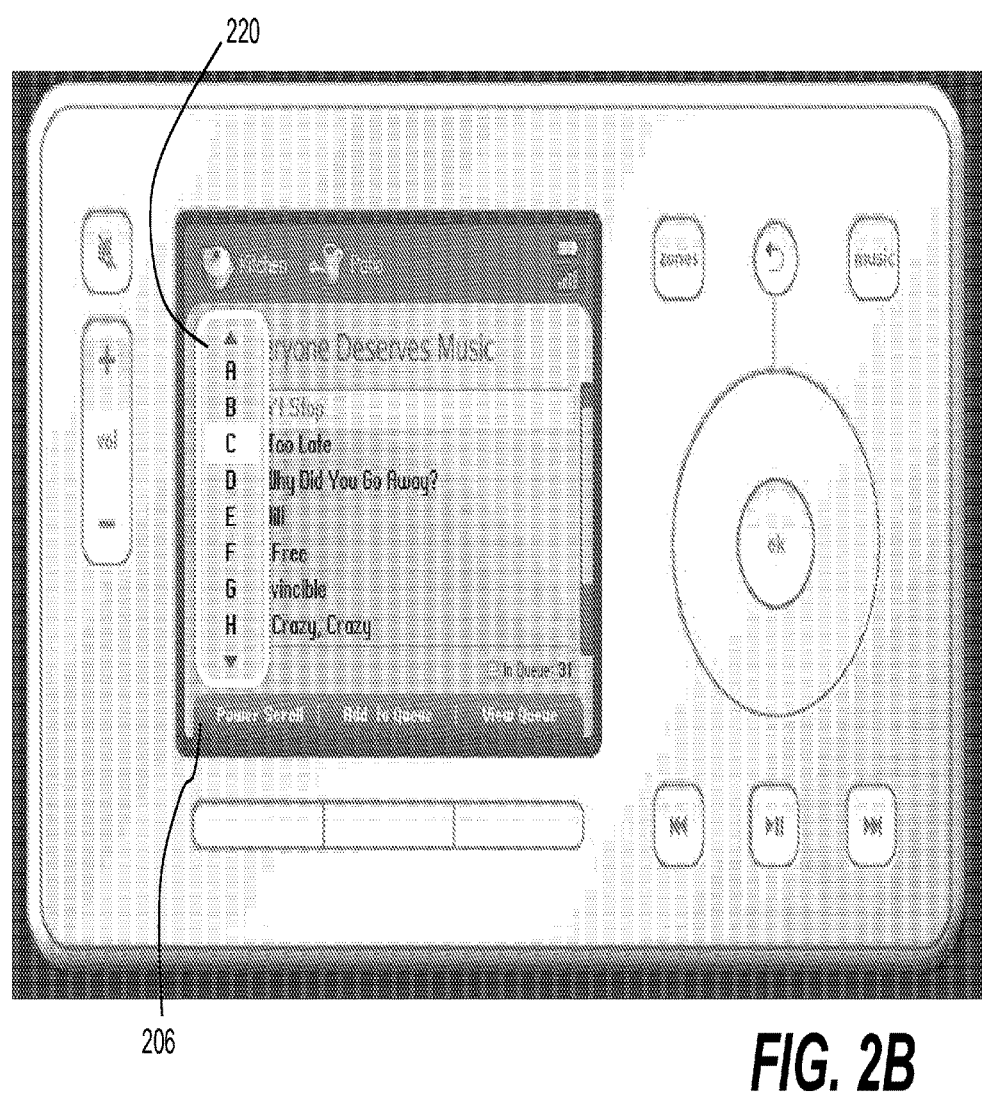
FIG. 2B shows that, after the power scroll key is activated, a display, referred to herein as an indexing display, is popped up or displayed.

FIG. 2B shows that, after the power scroll key 206 is activated, a display 220, referred to herein as an indexing display, is popped up or displayed. As used herein, it is defined that a display screen or a screen is a physical display apparatus in a device, such as the display screen 202 of FIG. 2A, while a screen display or simply a display is an image presented on a display screen. According to one embodiment, the indexing display 220 is superimposed onto a displayed portion of a list of items. In another embodiment, the indexing display 220 is displayed on a side of a displayed portion of a list of items.

In any case, the indexing display 220 provides a list of indexes, each configured to cover a predefined range or a group of items sharing a common feature. As shown in the figure, the indexing display 220 shows a list of alphabets, each of the alphabets covers words or letters that begin with the corresponding alphabet. In operation, a user uses the scroll key 204 to scroll to a desired alphabet in the indexing display 220 that then leads to the beginning, middle or ending of a list of items that begin with the desired alphabet. As a result, a user does not have to scroll from the beginning of a list of items all the way to a desired item. With the power scrolling, the user now is able to "jump" to a right starting point and navigate in a much narrowed list for the desired item.

Figure 2C:
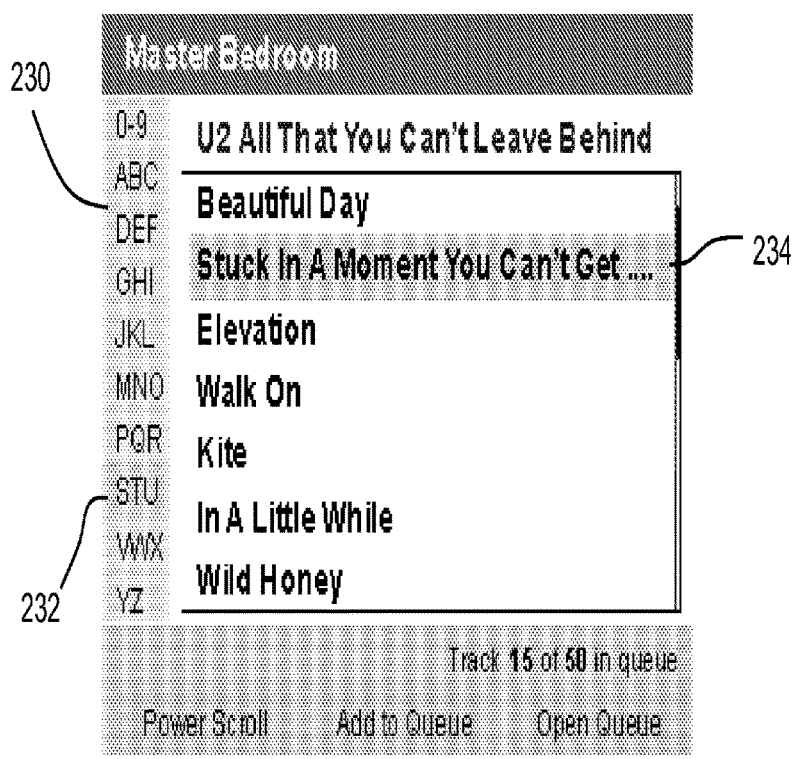
FIG. 2C shows another embodiment of the indexing display that shows a list of grouped indexes.

FIG. 2C shows another embodiment of the indexing display 230 that shows a list of grouped indexes. Instead of having one index for one type of items, one or more indexes are grouped as a grouped index such that all items in a list that begin with any index in one grouped index are associated with the grouped index. As shown in the figure, a grouped index "STU" 232 includes three characters and is selected, which leads to the beginning of items that are started with any of the characters "S", "T", and "U". As a result, a user does not have to go through items that begin with characters "A", "B", . . . or "R", and jump right into the items beginning with the characters "S", "T", or "U". In one embodiment in which the list is not sorted, as shown in FIG. 2C, the next item that the highlight 234 moves to is an item starting with any of the characters "S", "T", and "U". In other words, the scrolling bar 234 is configured to move either linearly or nonlinearly in accordance with a selection in the indexing display.

FIG. 2B and FIG. 2C show two examples of indexing characters. It should be noted that an indexing display is not necessary to display only the first character of a word, a phrase or a string. Depending on application, an article, such as "a" or "the" may not be indexed at all, in which case, a next word may be used for indexing purpose. It can also be appreciated that the power scrolling may be used in other categories. For example, a list of items may be organized in terms of characteristics, each of the characteristics is indexed by a label, or one or more of the characteristics are indexed by a grouped label. When the power scrolling is on, a set of desired characteristics in a long list can be readily located by the indexing display, where the indexing display provides a list of labels or grouped labels for limited scrolling.

According to one embodiment, a list of songs is organized in terms of genre (e.g., classic, jazz, Latin, pop, Rock . . . ). Each category may contain numerous songs. Going through the list all the way to a particular song in Rock can be tedious and experience the overshooting. With the power scrolling, the indexing display shows a list of the genre and provides means for jumping right into a desired category from which a desired song is readily located.

According to one embodiment, after an index is selected, an item highlighted in a list can be either a first one or a last one in the category or group indexed by the selected index. When the first one is highlighted in a display screen, a last item of a preceding group is also displayed in the display screen. When the last one is highlighted in a display screen, a first item of a following group is also displayed in the display screen.

Figure 3:
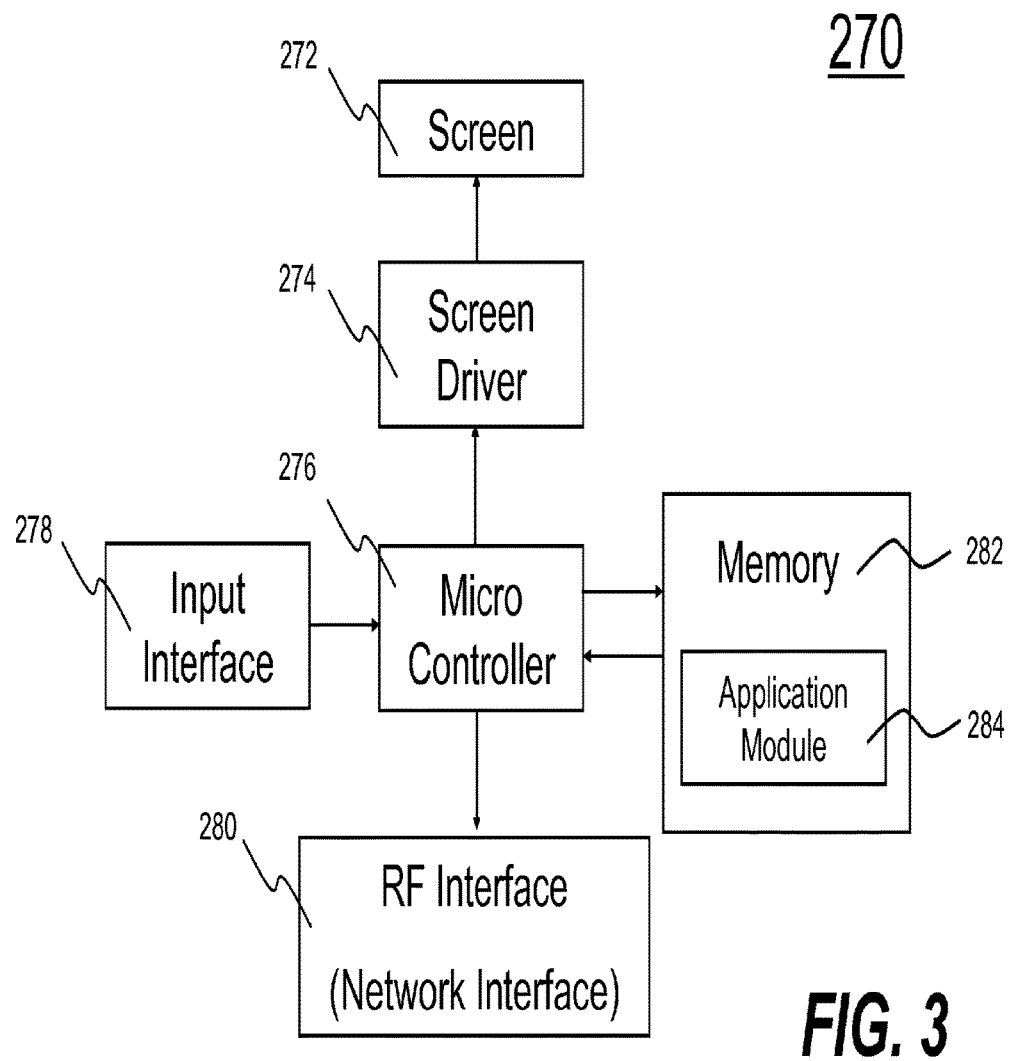
FIG. 3 illustrates an internal functional block diagram of an exemplary portable device.

The power scrolling may be implemented in a device with a display screen. FIG. 3 illustrates an internal functional block diagram of an exemplary controller 270. The screen 272 on the controller 270 may be a LCD screen. The screen 272 communicates with and is commanded by a screen driver 274 that is controlled by a microcontroller (e.g., a processor) 276. The memory 282 may be loaded with one or more application modules 284 that can be executed by the microcontroller 276 with or without a user input via the user interface 278 to achieve desired tasks. In one embodiment, an application module contemplating the power scrolling and enabling one or more soft keys is loaded in the memory 282.

The controller 270 includes a network interface 280 referred to as a RF interface 280 that facilitates wireless communication with another device being controlled by the controller 270 via a corresponding wireless interface or RF interface thereof.

Figure 4:
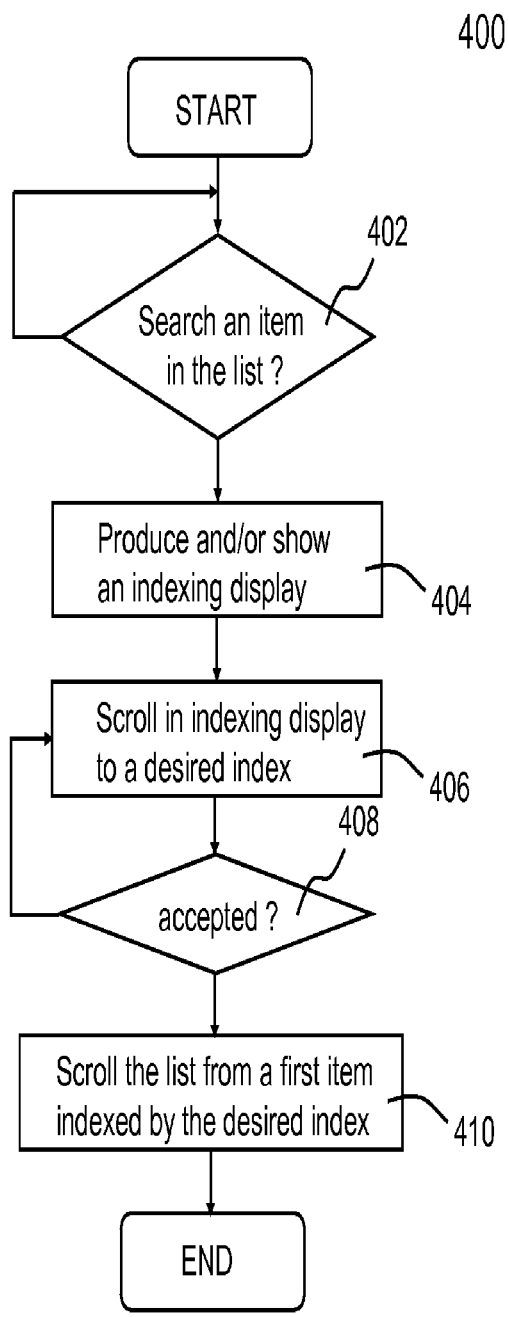
FIG. 4 shows a flowchart of scrolling a list of items in accordance with one embodiment of the present invention.

Referring now to FIG. 4, there shows a flowchart 400 of scrolling a list of items in accordance with one embodiment of the present invention. The flowchart 400 may be implemented in software, hardware or in a combination of both as a method, an apparatus or a part of a system. A list, typically containing many items, is displayed in a display screen. It can be appreciated by those skilled in the art that a list can be a collection of any items. To facilitate the understanding of the present invention, a list is considered a library of songs and each item is a song. The list is otherwise scrollable by a scroll wheel.

At 402, a user decides to look for an item in the list. Instead of starting scrolling the list, the user activates an indexing display that shows a list of indexes, each indexing a group of items that share one or more common features. In one example, the items in the group are all started with an identical character. In another example, the items in the group are started with one of limited number characters (e.g., three characters). In still another example, the items in the group belong to one category or kind.

In one embodiment, the list being displayed in an indexing display is pre-generated. If there is an index in the list that does not correspond to any item, an item that is closest to an item that would be otherwise indexed by the index is chosen. For example, an index "C" in the indexing display happens to be selected by a user while the underlying list does not have any items that are started with "C", in which case, either a last item in a group started with "B" or a first item in a group started with "D" is chosen. In another embodiment, the list being displayed in an indexing display is generated whenever this is an updated to the list of all items. At 406, the scroll wheel is associated with the indexing display such that the scrolling function now only applies to the indexing display. The user can quickly locate a desired index in the indexing display because the list in the indexing display is often short. At 408, if the located index is not the desired one, the process 400 goes back to 406 to allow the user continue looking for the desired one.

It is assumed that the located index is the desired one, the process 400 now goes to 410 where the scroll wheel is now associated with the list of all items. But the desired index brings a starting point right onto a very first item that is indexed by the desired index. From the starting point, the user can scroll the wheel to locate a desired item.

Figure 5A:
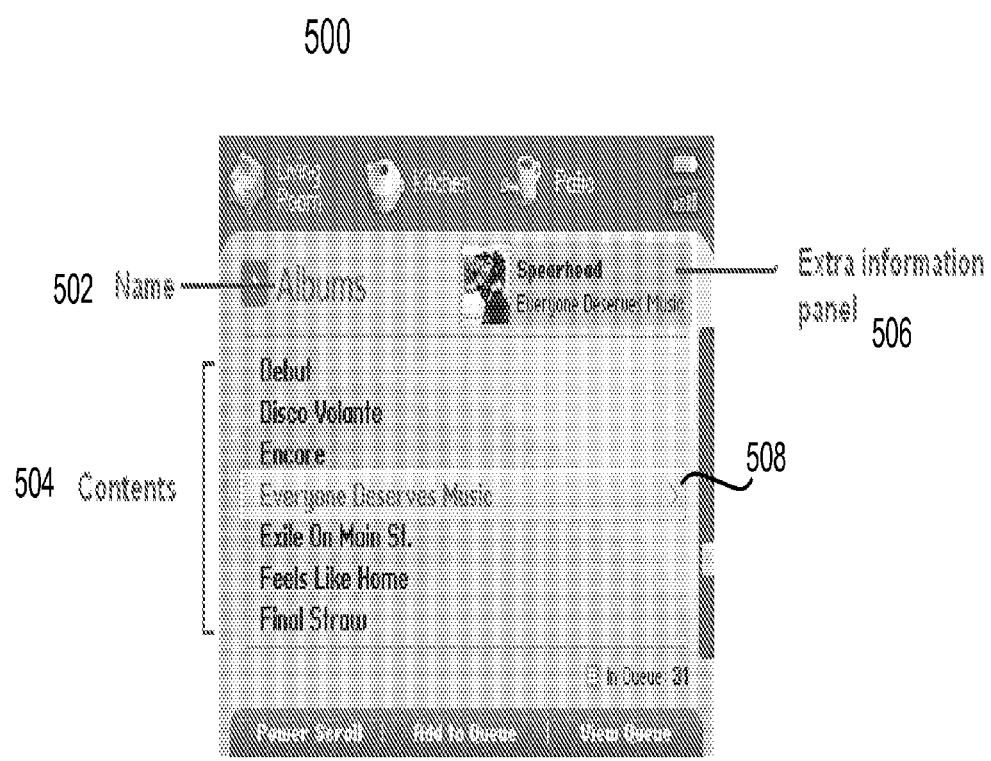
FIG. 5A shows an exemplary graphic user interface according to one embodiment of the present invention.

Referring now to FIG. 5A, there shows an exemplary graphic user interface 500 according to one embodiment of the present invention. The exemplary graphic user interface 500 is provided when a user desires to search an interested item in a list 504 or simply browse through the list. According to one embodiment, a library of multimedia items 504 (e.g., sound tracks or albums) called "albums" 502 is displayed. The number of the items may 504 exceed the display range of a display screen and thus become scrollable from one page to another. These items 504 may be provided locally or remotely. According to another embodiment in reference to FIG. 2B or 2C, the graphic user interface 500 is provided after a user selected an index in an indexing display.

Different from the prior art user interfaces, an information panel 506 is displayed when the user scrolls onto an item in the list 504 and stays thereon or highlights it for a predefined time (e.g., one second). Depending on implementation, the information panel 506 may be displayed anywhere without obstructing the highlighted item in the graphic user interface 500. As shown in FIG. 5A, the information panel 506 is displayed next to the name 502 of the list and shows a picture (album art), an album name and an associated artist thereof.

The specific location of the information panel 506 and the contents in the information panel 506 as shown in FIG. 5A shall not be considered as a limitation of the present invention. It can be appreciated by those skilled in the art that there are other ways to place the information panel 506 in the graphic user interface 500 and other information may be displayed in the information panel 506 when a corresponding item is highlighted. One of the important features in the present invention is to display additional or hidden information in a highlighted item. The hidden information is typically represented in metadata associated with the highlighted item. Depending on an exact application, the metadata associated with an item may be available locally or remotely.

In operation, when a list is being scrolled via a highlighting bar or a highlighting indicator, an information panel is superimposed in an area in a graphic user interface after an item is highlighted for a predefined time. This configurable delay provides at least two features. First, the delay allows a retrieval of the metadata of the highlighted item should a data source represented by the highlighted item happens to be remotely located (e.g., a song in another device across a network). Second, the delay avoids visual noise that shall be avoided when a user scrolls the list quickly. When the user scrolls through some other uninterested items at a certain speed, it is preferably required that the information panel is not shown or flashed by, which is achieved by the delay.

According to one embodiment, the information panel is configured to display the hidden information that may exceed a predefined display range of the information. Without obstructing the highlighted item, the information panel is automatically expanded to display the hidden information. In one embodiment as shown in FIG. 5A in which the information panel 506 is displayed next to the list name 502. The information panel 506 would be expanded to cover or obstruct the list name 502 in order to display the hidden information that exceeds the originally configured display size of the information panel 506.

In one embodiment, whenever an information panel obstructs something, the information panel is configured to disappear automatically after a predefined time (e.g., 5 seconds) so that the user can see what has been obstructed. What is important here is that the information panel is automatically displayed after an item in a list is highlighted for sometime and disappeared after sometime, without any action from the user, to avoid obscuring the user to continue browsing the list.

Figure 5B:
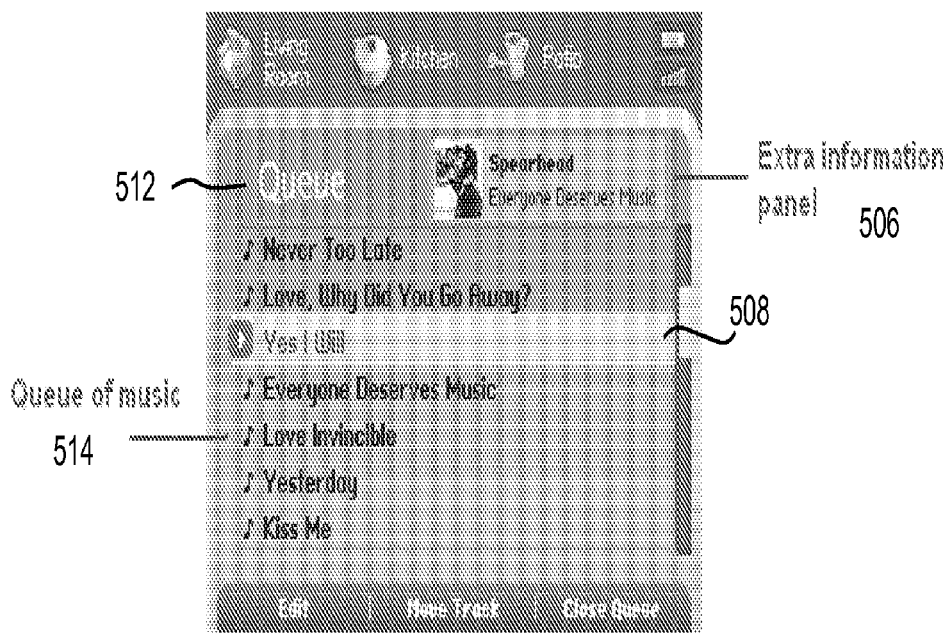
FIG. 5B shows a particular example in which a list named "Queue" includes a plurality of sound tracks.

FIG. 5B shows a list 512 named "Queue" that includes a plurality of sound tracks 514. As the user scrolls the tracks 514, one track 516 is highlighted by a scrolling bar for a predefined time, the information panel 506 is automatically activated to show the associated album art, the album name and the artist name so that the user sees more information about the highlighted item 516. The graphic user interface of FIG. 5B may be reached after the user selects the highlighted item 508 in FIG. 5A.

The examples in FIG. 5A or FIG. 5B pertain to songs, in which the information panel 506 shows a stationary picture. Those skilled in the art can appreciate that the information panel 506 can also be configured to display motion pictures. In certain applications, the metadata associated with an item pertains to a video clip. When the item is highlighted, the hidden video clip is played back to give the user a preview of the highlighted item. Depending on the nature of the item, the video clip may be a preview or a promotion. According to another embodiment, the information panel 506 is displayed to activate a preview of a song, for example, a sample of 15 seconds from the song. According to still another embodiment, the information panel 506 is displayed when the corresponding item is highlighted, in which case the information panel 506 is used to receive an input from the user (e.g., providing a rating on the item if desired).

Figure 6:
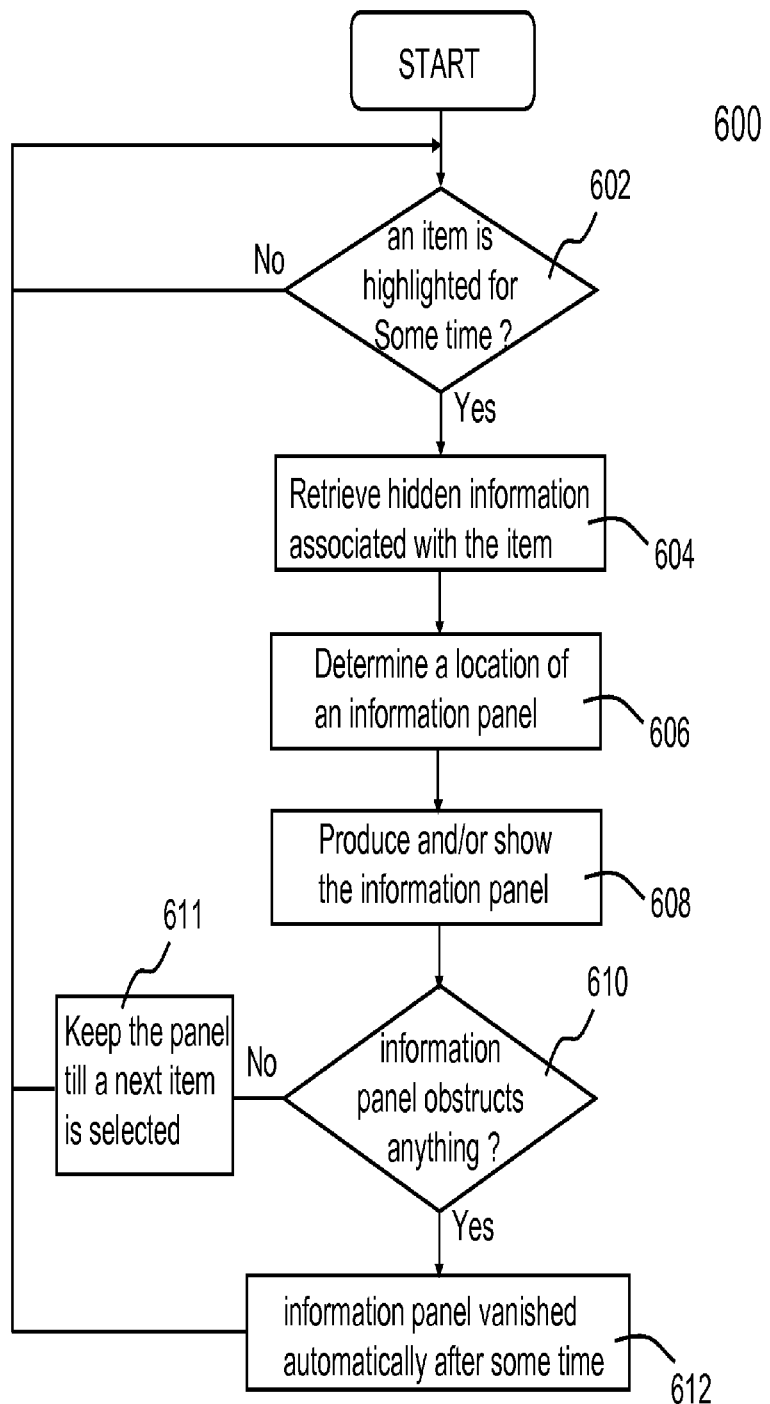
FIG. 6 shows a flowchart of providing an information panel after an item is highlighted, in accordance with one embodiment of the present invention.

Referring now to FIG. 6, there shows a flowchart or process 600 of providing an information panel in scrolling a list of items in accordance with one embodiment of the present invention. The process 600 may be implemented in software, hardware or in a combination of both as a method, an apparatus or a part of a system. In one embodiment, the process 600 is implemented as a software module that can be loaded in the memory 282 of FIG. 3 or as part of the application module 284.

A list, typically containing many items, is displayed in a display screen. It can be appreciated to those skilled in the art that a list can be a collection of any items. To facilitate the understanding of the present invention, a list is considered a library of songs and each item is a song. The list is otherwise scrollable by a scroll wheel.

At 602, the process 600 determines whether an item in the list is being highlighted for sometime (e.g., 1 second). If the item is just scrolled by, the process 600 is not activated. When it is determined that the item is highlighted or indicated by any means exceeding a predefined time, the process 600 goes to 604 where hidden information provided by the item is retrieved. Depending on the item, hidden information may be structured in different layers. In operation, the next layer of information is retrieved. Sometimes the hidden information is represented in metadata associated with the item. The metadata may be available locally or remotely. If the metadata is not available locally, a device practicing the process 600 is configured to request the metadata from another device that is remotely coupled to a network.

After the hidden information is retrieved, at 606, an information panel is constructed and determined to be displayed in an appropriate location of a graphic user interface. The location may be prefixed or dynamically determined. In any case, the location of the information panel is not to obstruct the item. At 608, the information panel is automatically displayed at the configured location associating with the item being highlighted.

Depending on the hidden information being displayed in the information panel, the size of the information panel may be expanded to accommodate the hidden information that may have to be extended in order to be comprehensible. At 610, if it is determined that the information panel is not obstructing anything in the graphic user interface, the information panel stays on and waits for a next item being scrolled on for sometime. If it is determined that the information panel is obstructing something in the graphic user interface, the process 600 goes to 612 where the information panel is automatically turned off to release the obstructed information so as to avoid obscuring a user to continue browsing the list. In one embodiment, the information panel may be configured to appear and disappear alternatively for sometime (e.g., 2 seconds each) provided the user is not scrolling onto another item.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. Accordingly, the scope of the present invention is defined by the appended claims rather than the forgoing description of embodiments.

We claim:

1. A non-transitory computer-readable medium storing instructions executable by one or more processors to cause a control device to perform operations comprising:

displaying, on a graphical user interface, an indicator positioned with respect to a particular multimedia item in a displayed list of a plurality of multimedia items, wherein the graphical user interface comprises a first area and a second area different from the first area, wherein the first area comprises the particular multimedia item and the indicator, and wherein the second area comprises at least a portion of one or more of the plurality of multimedia items different from the particular multimedia item;

after displaying the indicator on the graphical user interface for a first predefined time, displaying, on the graphical user interface, (i) the first area, and (ii) an information panel obstructing a least a portion of the second area, the information panel providing information associated with the particular multimedia item that is not shown in the displayed list and instead displayed in the information panel in association with the particular multimedia item via the graphical user interface;

detecting that the information panel is obstructing one of the plurality of multimedia items in the second area; and in response to detecting that the information panel is obstructing one of the plurality of multimedia items in the second area, terminating display of the information panel after displaying the information panel for a second predefined time.

2. The non-transitory computer-readable medium of claim 1, wherein the operations further comprise:
prior to displaying the indicator positioned with respect to the particular multimedia item, receiving an input indicating a selection of the particular multimedia item.

3. The non-transitory computer-readable medium of claim 1, wherein each multimedia item in the plurality of multimedia items share at least one common characteristic, and wherein the operations further comprise:
prior to displaying the indicator, receiving an input indicating a selection of the at least one common characteristic; and
in response to the received input, displaying the list of the plurality of multimedia items on the graphical user interface.

4. The non-transitory computer-readable medium of claim 1, wherein the information associated with the particular multimedia item is not otherwise viewable in the displayed list of the plurality of multimedia items.

5. The non-transitory computer-readable medium of claim 1, wherein displaying on the graphical user interface, the information panel further comprises:
transmitting, to a remote device, a request for information associated with the particular multimedia item;
receiving the information associated with the particular multimedia item from the remote device; and
displaying in the information panel on the graphical user interface, the information associated with the particular multimedia item.

6. The non-transitory computer-readable medium of claim 5, wherein transmitting, to the remote device, a request for information associated with the particular multimedia item comprises:
upon displaying the indicator, transmitting, to the remote device, the request for information associated with the particular multimedia item.

7. The non-transitory computer-readable medium of claim 5, wherein transmitting to the remote device, a request for information associated with the particular multimedia item comprises:
after displaying the indicator on the graphical user interface for a third predefined time, transmitting to the remote device, the request for information associated with the particular multimedia item.

8. The non-transitory computer-readable medium of claim 1, wherein displaying the indicator comprises a highlighting of a representation of the particular multimedia item in the displayed list of the plurality of multimedia items.

9. The non-transitory computer-readable medium of claim 1, wherein the information comprises one or more of (a) a motion picture associated with the particular multimedia item, (b) metadata associated with the particular multimedia item, and (c) images associated with the particular multimedia item.

10. A method comprising:
displaying, on a graphical user interface, an indicator positioned with respect to a particular multimedia item in a displayed list of a plurality of multimedia items, wherein the graphical user interface comprises a first area and a second area different from the first area, wherein the first area comprises the particular multimedia item and the indicator, and wherein the second area comprises at least a portion of one or more of the plurality of multimedia items different from the particular multimedia item;
after displaying the indicator on the graphical user interface for a first predefined time, displaying, on the graphical user interface, (i) the first area, and (ii) an information panel obstructing a least a portion of the second area, the information panel providing information associated with the particular multimedia item that is not shown in the displayed list and instead displayed in the information panel in association with the particular multimedia item via the graphical user interface;
detecting that the information panel is obstructing one of the plurality of multimedia items in the second area; and
in response to detecting that the information panel is obstructing one of the plurality of multimedia items in the second area, terminating display of the information panel after displaying the information panel for a second predefined time.

11. The method of claim 10, further comprising:
prior to displaying the indicator positioned with respect to the particular multimedia item, receiving an input indicating a selection of the particular multimedia item.

12. The method of claim 10, wherein each multimedia item in the plurality of multimedia items share at least one common characteristic, and wherein the method further comprises:
prior to displaying the indicator, receiving an input indicating a selection of the at least one common characteristic; and
in response to the received input, displaying the list of the plurality of multimedia items on the graphical user interface.

13. The method of claim 10, wherein the information is not otherwise viewable in the displayed list of the plurality of multimedia items.

14. The method of claim 10, wherein displaying, on the graphical user interface, the information panel further comprises:
transmitting, to a remote device, a request for information associated with the particular multimedia item;
receiving the information associated with the particular multimedia item from the remote device; and
displaying in the information panel on the graphical user interface, the information associated with the particular multimedia item.

15. The method of claim 14, wherein transmitting, to the remote device, a request for information associated with the particular multimedia item comprises:
upon displaying the indicator, transmitting, to the remote device, the request for information associated with the particular multimedia item.

16. The method of claim 14, wherein transmitting to the remote device, a request for information associated with the particular multimedia item comprises:
after displaying the indicator on the graphical user interface for a third predefined time, transmitting to the remote device, the request for information associated with the particular multimedia item.

17. The method of claim 10, wherein displaying the indicator comprises a highlighting of a representation of the particular multimedia item in the displayed list of the plurality of multimedia items.

18. The method of claim 10, wherein the information comprises one or more of (a) a motion picture associated with the particular multimedia item, (b) metadata associated with the particular multimedia item, and (c) images associated with the particular multimedia item.

19. A controller device comprising:
a processor; and
memory storing instructions executable by the processor to cause the controller device to perform functions comprising:
  displaying, on a graphical user interface, an indicator positioned with respect to a particular multimedia item in a displayed list of a plurality of multimedia items, wherein the graphical user interface comprises a first area and a second area different from the first area, wherein the first area comprises the particular multimedia item and the indicator, and wherein the second area comprises at least a portion of one or more of the plurality of multimedia items different from the particular multimedia item;
  after displaying the indicator on the graphical user interface for a first predefined time, displaying on the graphical user interface, (i) the first area, and (ii) an information panel obstructing a least a portion of the second area, the information panel providing information associated with the particular multimedia item that is not shown in the displayed list and instead displayed in the information panel in association with the particular multimedia item via the graphical user interface;
  detecting that the information panel is obstructing one of the plurality of multimedia items in the second area; and
  in response to detecting that the information panel is obstructing one of the plurality of multimedia items in the second area, terminating display of the information panel after displaying the information panel for a second predefined time.

20. The controller device of claim 19, wherein the functions further comprise prior to displaying the indicator positioned with respect to the particular multimedia item, receiving an input indicating a selection of the particular multimedia item.

* * * * *